United States Patent [19]
Schmidt

[11] Patent Number: 5,732,011
[45] Date of Patent: Mar. 24, 1998

[54] DIGITAL SYSTEM HAVING HIGH SPEED BUFFERING

[75] Inventor: Steven G. Schmidt, Mount Holly, N.J.

[73] Assignee: General Signal Corporation, Stamford, Conn.

[21] Appl. No.: 801,908

[22] Filed: Feb. 14, 1997

Related U.S. Application Data

[60] Provisional application No. 60/021,189 Jul. 3, 1996.
[51] Int. Cl.$^6$ ............................ G11C 13/00
[52] U.S. Cl. ............... 365/73; 365/221; 365/238
[58] Field of Search ................ 365/73, 75, 221, 365/238, 189.01, 230.01

[56] References Cited

U.S. PATENT DOCUMENTS

| | | |
|---|---|---|
| 3,493,956 | 2/1970 | Andrews ............... 365/189.01 |
| 4,090,256 | 5/1978 | Schmidt . |
| 4,459,681 | 7/1984 | Ohtsuka . |
| 4,624,797 | 11/1986 | Hoberman . |
| 4,903,242 | 2/1990 | Hamaguchi et al. . |
| 4,954,994 | 9/1990 | Hashimoto . |
| 5,157,633 | 10/1992 | Aoki . |
| 5,177,704 | 1/1993 | D'Luna . |
| 5,253,213 | 10/1993 | Matsumura et al. . |
| 5,262,997 | 11/1993 | Lee . |
| 5,272,675 | 12/1993 | Kobayashi . |

Primary Examiner—Terrell W. Fears
Attorney, Agent, or Firm—Ohlandt, Greeley, Ruggiero & Perle

[57] ABSTRACT

A FIFO memory eliminates the delay associated with selecting memory locations during a read and write operation and prevents data intended to be saved from changing during the write operation. The FIFO memory includes a shift register having a plurality of memory locations, data input and data output terminals coupled to the memory, a first memory location coupled to the data output terminal that is immediately output enabled in response to a read operation, and a single pointer arrangement coupled to the memory locations for selectively saving data contents in successive memory locations coincidentally with the occurrence of successive write operations.

11 Claims, 5 Drawing Sheets

FIFO USING SAVE POINTER

DIGITAL SYSTEM HAVING HIGH SPEED BUFFERING

This application claims the benefit of U.S. provisional application Ser. No. 60/021,189 filed Jul. 3, 1996.

FIELD OF THE INVENTION

The invention relates to high speed buffering schemes in connection with digital systems. More particularly, it relates to first-in first-out memories in which a single save pointer means is provided so that the contents at certain memory locations can be saved.

DESCRIPTION OF PRIOR ART

A first-in first-out (FIFO) memory involves a storage scheme that temporarily stores incoming data and outputs the data in the same sequence as it was stored. The conventional FIFO memory includes a memory or storage unit for storing data and a pointer system for selectively reading data out from and writing data into memory locations. The FIFO memory (hereinafter called FIFO) is typically used to perform a buffering function, i.e., to store data on a temporary basis until a subsequent stage in the overall system is available to process the data.

The conventional pointer system employed in FIFOs typically utilizes both a READ pointer for selecting the memory location to be read out and a WRITE pointer for selecting the memory location to be written in. Memory locations within the FIFO are not altered until after a write or read operation is initiated. For any read or write operation in a FIFO, only one READ or WRITE pointer is active. In order to furnish the man skilled in the art some examples of digital systems involving FIFO buffering possessing the aforesaid characteristics, reference may be made to the following U.S. Pat. Nos. 5,177,704, 5,262,997 and 5,272,675.

In the operation of a conventional FIFO as shown in FIG. 5 for illustration purposes, the data on the DATA bus changes every time the system clock rises assuming that there is some delay. During any cycle, valid data (v) destined for the FIFO may be applied to the FIFO inputs. If a WRITE enable is asserted, the FIFO's internal pointer logic selects a memory location to be written at a later time. The amount of time it takes for the pointer logic to select the memory location is critical. In fact, the speed of the pointer logic varies with its complexity. However, the pointer logic used in conventional FIFOs are quite complex, often requiring at a minimum two pointers, READ and WRITE in which only one READ or WRITE pointer is active for any read or write operation. Consequently, by the time the memory location is selected, the data has changed to some other invalid data (v+1) and is lost, as shown in FIG. 5.

The most common method to remedy this problem is to add delay to the incoming data to compensate for the slower pointer circuitry. When an empty FIFO is written to, the data is not immediately available for reading from the data input terminal because of the added input delay. This input delay is known as "bubble through." Bubble through refers to the several cycles necessary for the data to bubble through the FIFO. However, bubble through is undesirable when using small FIFOs. The smaller the FIFO the greater the effect "bubble through" has on system performance.

A better approach to this problem is to have a simple efficient pointer circuitry. In particular, it would be highly advantageous if a FIFO with a simplified pointer logic employing a single SAVE pointer could be devised to eliminate delay attributed to the complexity of the conventional pointer logic in selecting memory locations in response to a read or write operation.

Accordingly, its is a fundamental object of the present invention to provide a FIFO design as specified above.

It is a further object of the invention to provide a FIFO having pointer circuitry so organized that any number of save pointers may be active or asserted.

It is also a further object of the invention to provide a FIFO where data from a data input terminal is continually written in all memory locations that do not have saved data.

SUMMARY OF THE INVENTION

The present invention in its broadest or primary aspect relates to a first-in first-out memory comprising a shift register having a plurality of memory locations; data input and data output terminals coupled to the memory locations; and single pointer means coupled to the memory locations for selectively saving data contents in successive memory locations coincidentally with the occurrence of successive write operations.

The present invention provides a FIFO in which data is immediately ready for saving from the data input terminal. An unique single pointer means is employed to eliminate the delay associated with selecting a memory location in response to a write operation. This single pointer means disables further writing in memory locations having saved data and enables further writing in memory locations after valid data has been read out. Any number of save pointers may remain active, allowing memory locations to be altered prior to a read or write operation. In addition, all memory locations except those having saved data, i.e., where the save pointer means corresponding to a memory location is asserted, continually store data from the data input terminal. As a result, prior to a write operation, data is stored in the next available memory location ensuring that the data from the data input terminal to be saved does not change during the time it takes to implement a write operation.

Further, unlike FIFOs with a conventional pointer system, the unique design of the present invention does not utilize an added data input delay typically referred to as "bubble through" which significantly slows down system performance. As explained above, the unique single pointer means stores data to be saved in a selected memory prior to a write operation, whereas conventional pointer systems select the memory location and store the data to be saved in the selected memory location some time after a write operation. As illustrated by the timing diagram in FIG. 4, the FIFO has one clock cycle to determine whether data from the DATA bus should be saved. Therefore, the FIFO has no delay associated with the selection of a memory location in response to a write operation.

The present invention also provides a FIFO in which its contents are immediately output enabled in response to a read operation. Data is saved successively from the first memory location to the final memory location, and the first memory location is coupled to a data output terminal. During a read operation, assuming that the FIFO is not empty, the contents of the first memory location are output enabled. After the read operation, valid data in the other memory locations are shifted to the next respective locations, i.e., to their original locations minus 1. The address of the memory location for a read operation is always the first memory location. Thus, the FIFO has no delay associated with selecting the proper memory location to read out.

Other and further objects, advantages and features of the present invention will be understood by reference to the following specification in conjunction with the annexed drawings, wherein like parts have been given like numbers.

DESCRIPTION OF THE PREFERRED EMBODIMENTS

Before proceeding with a detailed description of a preferred embodiment of the present invention, it is well to define certain terms used herein. The definition of "single pointer means" is a pointer means having a single function, i.e., it is used for selectively saving data in memory locations coincidentally with the occurrence of successive write operations.

Figure 1:
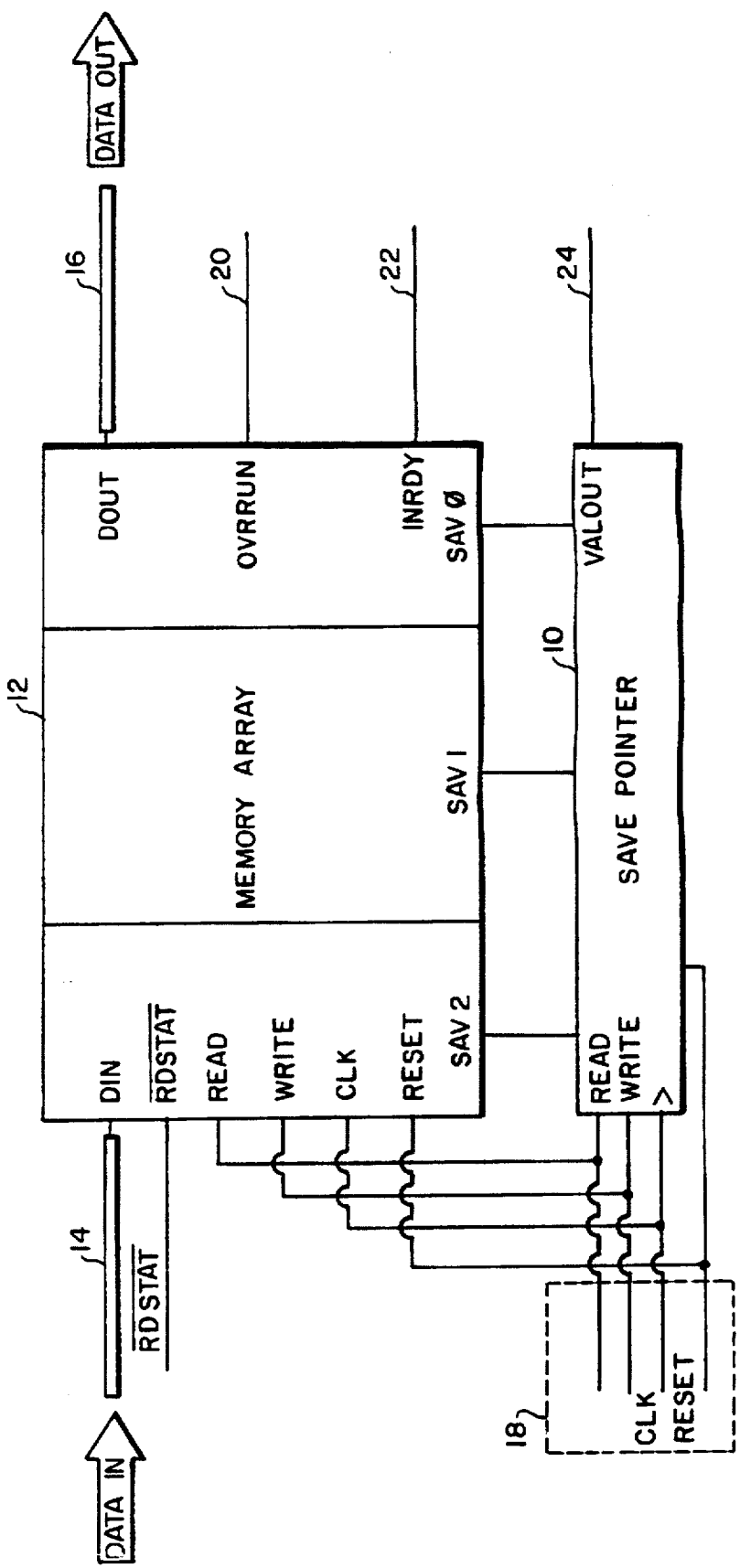
FIG. 1 is a block diagram of the preferred embodiment.

Referring to FIG. 1 in the drawing, a FIFO memory embodying the present invention largely comprises single pointer means 10, memory array 12, data-in bus (DIN) 14 and data-out bus (DOUT) 16. A group of input lines 18 connects respectively to READ, WRITE, CLK and RESET inputs on both the single pointer means 10 and memory array 12. Another input line connects to NOT RDSTAT. The single pointer means 10 communicates to the memory array 12 which one of the memory locations is to have its data saved. It also provides a VALOUT signal 24 when a valid output is available. The memory array 12 stores the data based on the SAVX inputs from single pointer means 10. The memory array 12 also provides the input ready output (INRDY) 22 and over run output (OVRRUN) 20 based on the contents of the memory array.

Figure 2:
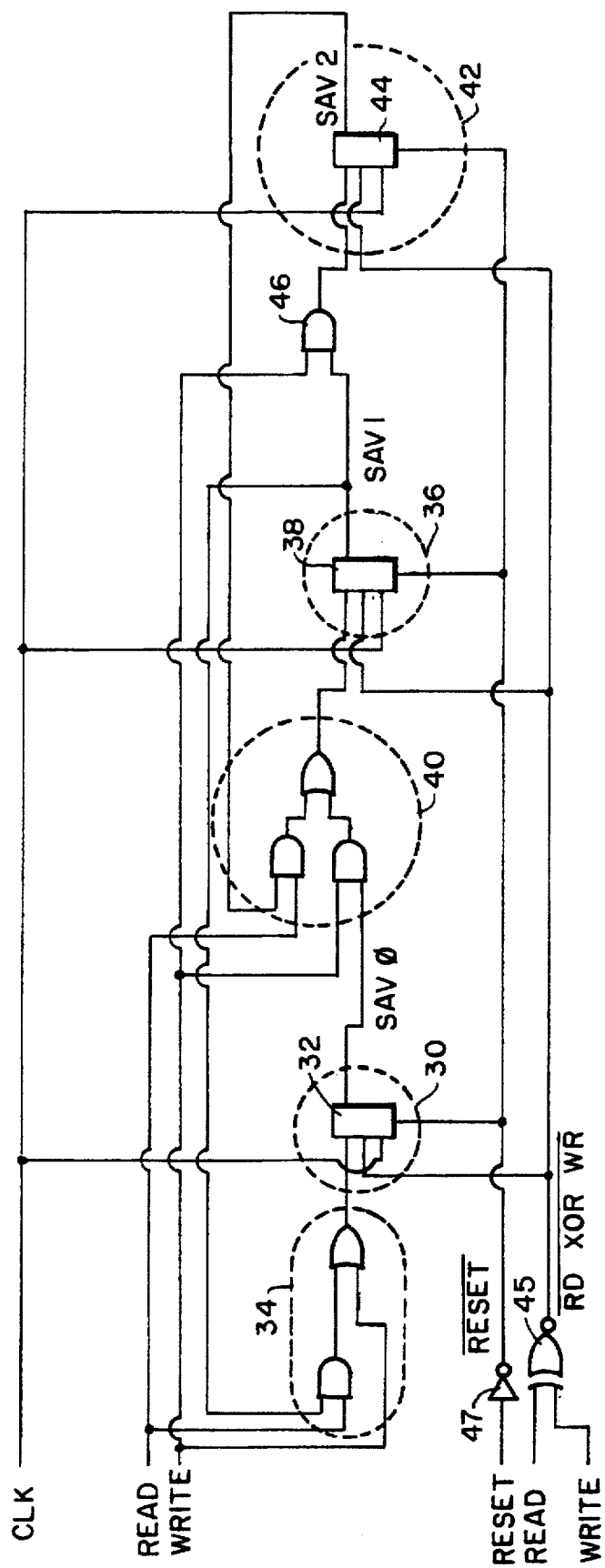
FIG. 2 is a schematic diagram illustrating the logic circuit arrangement of the pointer means in FIG. 1.

FIG. 2. shows a detailed logic diagram for single pointer means 10 having only three pointers 30, 36 and 42. Although FIG. 2 describes a 3 pointer system, the pointer method can be applied to a system of any number of pointers. Pointers 30, 36 and 42 comprise corresponding enable flip-flops FF 32, FF 38 and FF 44 having respective outputs SAV0, SAV1 and SAV2. FF 32, FF 38 and FF 44 have their clock inputs connected to CLK. Their enable inputs are connected to the NOT RDXORWR output line of an inverted XOR gate 45, and their reset inputs are connected to NOT RESET output line from inverter 47. It will be appreciated that pointer means 10 for selectively saving data essentially functions as a shift register, and its pointers only change state when NOT RDXORWR is asserted.

Figure 3:
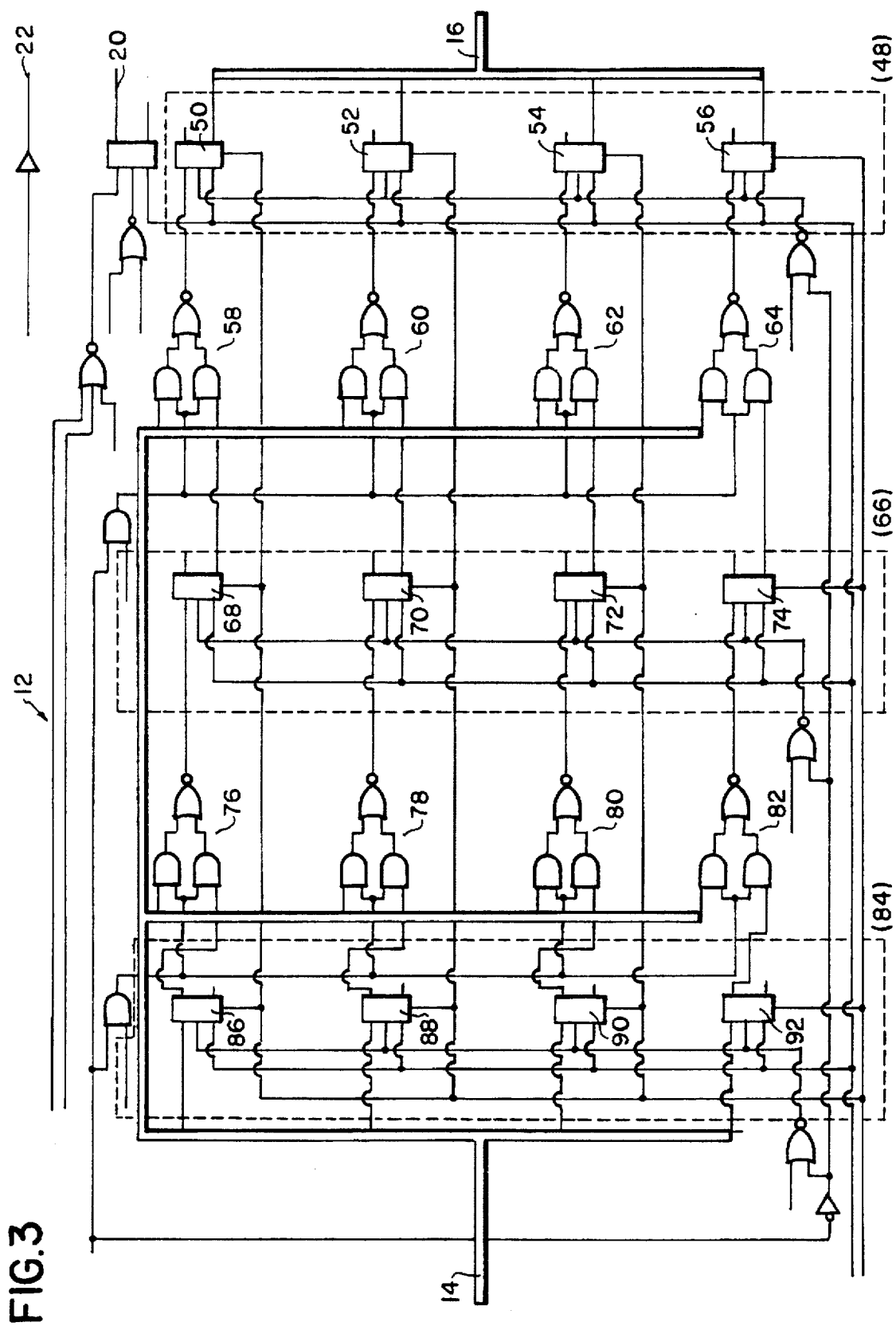
FIG. 3 is a schematic diagram illustrating the circuit arrangement of the memory locations in FIG. 1.

FIG. 3 shows the memory array 12. The memory array 12 shown is four bits wide by three locations deep having a first memory location with its outputs coupled to output terminal 16. It will be understood that memory array 12 could be any number of bits wide by any number of locations deep. Memory array 12 comprises memory location 48 (zero), memory location 66 (one) and memory location 84 (two), each having four ordinary flip-flops. The first memory location, memory location 48 (zero), has its outputs coupled to output terminal 16. Memory location 48 (zero) through 84 (two) have corresponding outputs of save pointer means, SAV0 through SAV2, which disable further writing into their respective memory locations when data is saved into their memory locations and enables further writing in their memory locations when data is read out of their memory locations. Each ordinary flip-flop has its clock input connected to CLK and its reset input connected to NOT RESET via the output of an inverter. At reset, all memory locations are thus cleared. Although the memory devices shown in FIG. 3 are ordinary flip-flops, static RAM cells or some other memory structure can be used.

Coupled between each memory location, for instance a memory location Y and memory location X, are multiplexers (MUXs) that are either set to output the data from DIN when READ is not asserted or the contents of the latter memory location Y when SHFX signal of the memory location X is asserted. The SHFX signal serves as a shift command when READ is asserted and memory location Y has saved. For example, the input of flip-flops 50, 52, 54 and 56 of memory location 48 (zero) are respectively connected to the output of MUXs 58, 60, 62 and 64 using AND and OR gates. MUXs 58, 60, 62 and 64 are set to select either the DIN0 through DIN3 inputs or the outputs of memory location's 66 (one) flip-flops 68, 70, 72 and 74. The MUXs select DIN 0 through DIN 3 when READ is not asserted. Otherwise, a read operation causes a shift operation to occur if valid data is saved in the next location. In particular, the SHF0 signal is only asserted during a read operation if SAV1 is set. This indicates that valid data is saved in memory location 66 (one) and should be shifted to memory location 48 (zero) in preparation for the next read operation. If SAV1 is not set during a read operation, memory location 48 (zero) is loaded from DIN 0 through DIN 3 in preparation for the next SAV operation. The multiplexing of input data and saved data via the MUXs allows parallel read/write operations to occur and eliminates "bubble through" on the first write.

Memory array 12 also provides two status flags, OVERRUN 20 and INRDY 22. OVERRUN 20 is set if WRITE is asserted when all locations have saved data and the FIFO is not being read. INRDY 22 is asserted as long as the last FIFO location 84 (two) does not have saved data.

Figure 4:
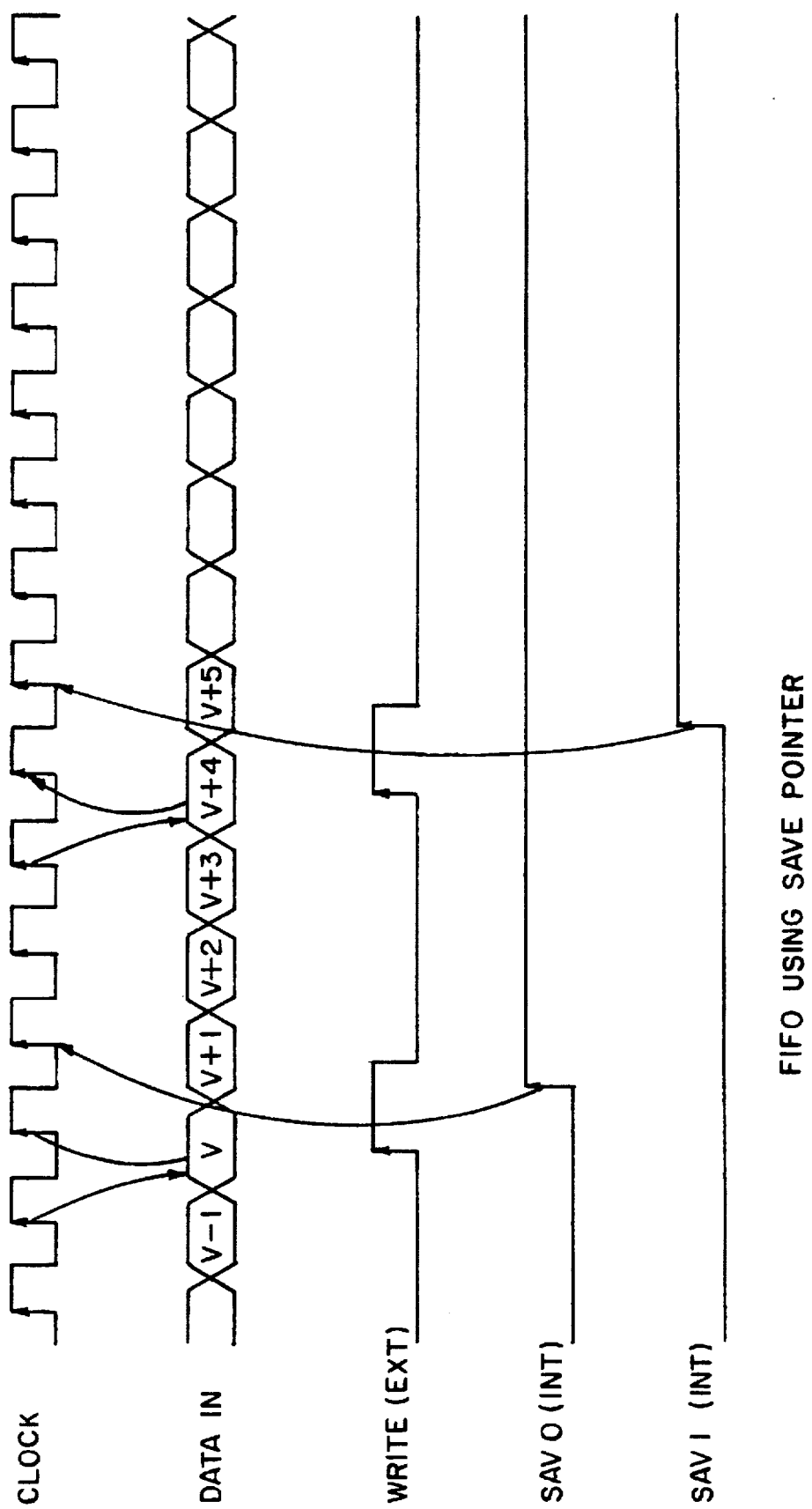
FIG. 4 is a timing diagram illustrating the operation of the memory of FIG. 1.
Figure 5:
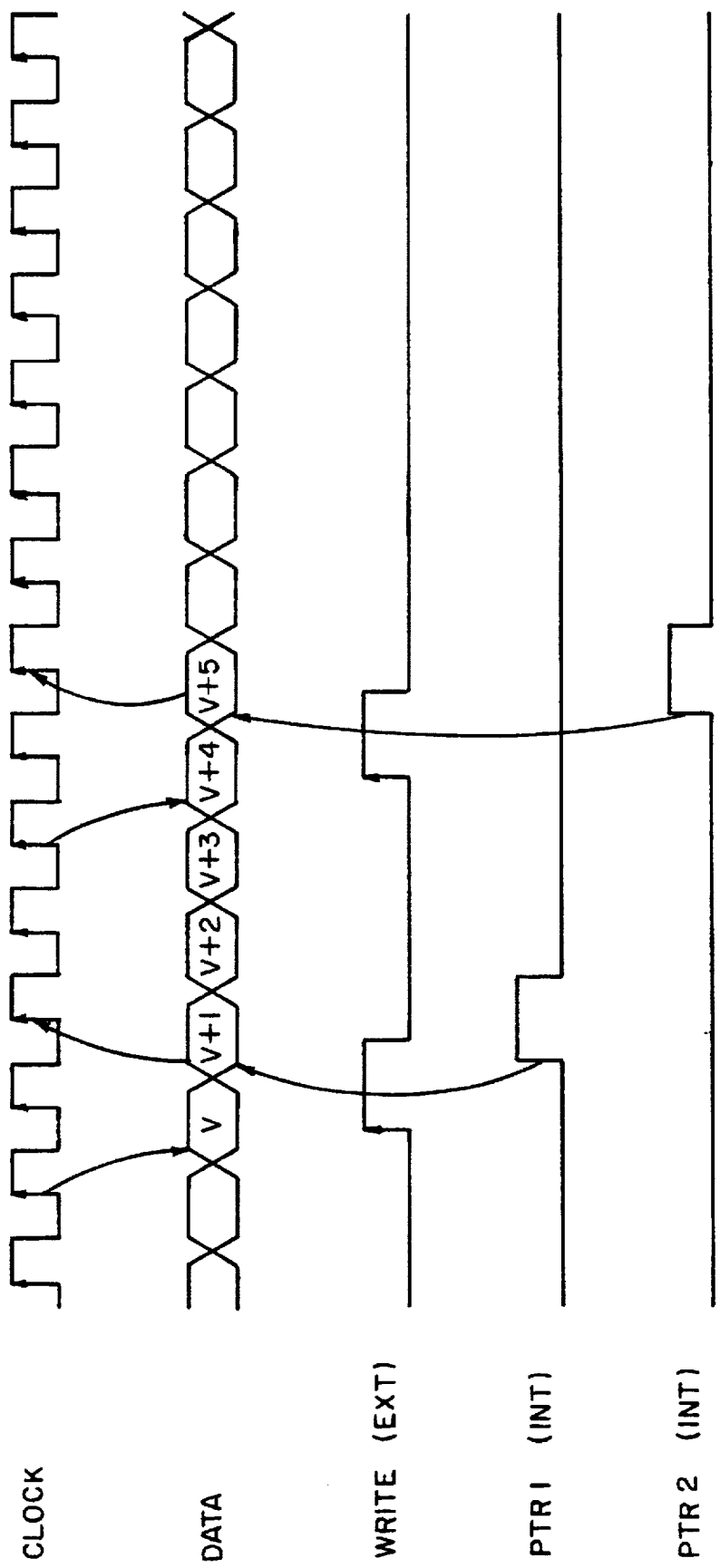
FIG. 5 is a timing diagram illustrating the operation of the memory in the prior art.

As shown in FIGS. 2, 3 and 4, in normal operation of memory array 12, reset is initially enabled clearing all memory locations, memory locations 48 (zero) through 84 (two), and all SAV inputs, SAV0 through SAV2. Reset is then de-asserted to enable all memory locations for storage on every clock cycle. INRDY 22 is asserted and VALOUT 20 is de-asserted. Multiplexers 58, 50, 62 and 64 feeding memory location 48 (zero) and multiplexers 76, 78, 80 and 82 feeding memory location 66 (one) is set to select the DIN inputs 14 because a read operation is not occurring.

After the FIFO has been initialized, data from DIN 14 is continually written to all memory locations that do not currently have saved data on each rising clock cycle, as illustrated in FIG. 4. The pointer circuitry has an entire clock cycle to determine whether data should be saved. If the data from DIN 14 changes during this decision time, it has no effect on the storage of the data since storage has already been accomplished. When WRITE is asserted for the first time, the output SAV0 of FF 32 is asserted via an AND and OR gate combination 34 connected to the input of FF 32. The contents of memory location 48 (zero) are preserved by a corresponding asserted SAV0 which disables flip-flops 50, 52, 54 and 56. VALOUT 24 is asserted because valid data has been saved into the first memory location 48 (zero). When the next write is asserted (assuming no read operations in between), the output SAV1 of FF 38 is asserted via MUX 40 using AND and OR gates connected to the input of FF 38. The contents of memory location 66 (one) are preserved by a corresponding asserted SAV1 which disables flip-flops 68, 70, 72 and 74. When the next write is asserted (assuming no read operations in between), the output SAV2 of FF 44 is asserted via an AND gate 46 connected to the input of FF 44. The contents of memory location two 84 are preserved by a corresponding asserted SAV2 which disables flip-flops 86, 88, 90 and 92. At this point, the FIFO is full and INRDY 22 is de-asserted because the pointer output for the final memory location, SAV2, is asserted.

When READ is asserted, the contents of memory location 48 (zero) are output enabled. SHF0 and SHF1 are asserted because READ is asserted and memory locations 66 (one) and 84 (two) initially have saved data. As a result, the contents of memory location 66 (one) are shifted into memory location 48 (zero) via MUXs 58, 60, 62 and 64, and the contents of memory location 84 (two) are then shifted into memory location 66 (one) via MUXs 76, 78, 80 and 82. SAV2 is then de-asserted due to a low on the output of the AND gate 46 preceding FF 44. The output of the AND gate 44 is low because it is not a write operation. INRDY 22 is asserted and SAV0 and SAV1 remain asserted. When READ is asserted again, the contents of memory location 48 (zero) are output enabled. SHF0 is asserted because READ is asserted and memory locations 66 (one) has saved data. As a result, the contents of memory location 66 (one) is shifted into memory location 48 (zero) via MUXs 58, 60, 62 and 64. SAV1 is then de-asserted because FF 38 now sees a de-asserted SAV2 via MUX 40. However, SAV0 remains asserted. When READ is asserted again, the contents of memory location 48 (zero) are output enabled. SAV0 is cleared because FF 32 now sees a cleared SAV1 via AND and OR gate combination 34. VALOUT 24 is asserted because SAV0 is de-asserted and the FIFO is empty.

The above example shows that, for successive writes, the SAV signals are asserted from left to right and for read operations they are de-asserted from right to left. As previously mentioned, FF 32, FF 38 and FF 44 are only enabled when READ or WRITE is asserted, but not both. When both are asserted together, the memory locations to be saved does no change. The example describes loading the FIFO completely before reading out the contents. It is not necessary to wait for the FIFO to fill before reading it. The FIFO can handle any combination of reads and writes.

What has been disclosed herein in accordance with the present invention is a first-in first-out memory comprising a shift register having a plurality of memory locations; data input and data output terminals coupled to the memory locations wherein, prior to a write operation, data from the data input terminal is written in a selected memory location for preventing the data intended to be saved from changing during the write operation; a first memory location wherein the contents of the first memory location are immediately output enabled in response to a read operation; and single pointer means coupled to the memory locations for selectively saving data contents in successive memory locations coincidentally with the occurrence of successive write operations.

The invention having thus described with particular reference to the preferred forms thereof, it will be obvious that various changes and modifications may be made therein without departing from the spirit and scope of the invention as defined in he appended claims.

I claim:

1. A FIFO memory comprising:
   a shift register having a plurality of memory locations;
   data input and data output terminals coupled to said memory locations; and
   single pointer means coupled to said memory locations for selectively saving data contents in successive memory locations coincidentally with the occurrence of successive write operations.

2. The FIFO memory recited in claim 1, wherein data from said data input terminal is immediately available for saving in a selected memory location.

3. The FIFO memory recited in claim 2, wherein, prior to a write operation, data from said data input terminal is stored in the next available memory location, thereby preserving the data intended to be saved during the implementation of the write operation.

4. The FIFO memory recited in claim 3, wherein data from said data input terminal is continually written in said memory locations except into those in which data is being saved.

5. The FIFO memory recited in claim 1, having a first memory location wherein contents of said first memory location are immediately output enabled in response to a read operation.

6. The FIFO memory recited in claim 1, wherein said single pointer means comprises a plurality of pointers remaining active for disabling further writing into said memory locations when data is saved in said memory locations and for enabling writing into said memory locations when data is read out of said memory locations.

7. The FIFO memory recited in claim 6, wherein said pointer means comprises a plurality of enable flip-flops and AND and OR gates.

8. A FIFO memory comprising:
   a plurality of memory locations coupled to a data input terminal, wherein data from said data input terminal is continually written into all memory locations except into those in which data is being saved;
   a first of said memory locations being directly coupled to a data output terminal, wherein contents of said first memory location are output enabled when a read operation occurs, and after the read operation, the contents of each memory location having saved data is shifted to its location minus 1; and
   single pointer means for receiving read, write and synchronous clock signals and generating control signals in response thereto, which control signals are sent to corresponding memory locations for disabling further storing into said memory locations when data is saved in said memory locations.

9. The FIFO memory recited in claim 8, wherein said control signals further enable writing into said memory locations when data is read out of said memory locations.

10. The FIFO memory recited in claim 7, wherein said memory locations comprises a plurality of flip-flops.

11. The FIFO memory recited in claim 7, wherein said memory locations comprises a plurality of static RAM cells.

* * * * *